(12) United States Patent
Higgins

(10) Patent No.: US 9,361,162 B1
(45) Date of Patent: Jun. 7, 2016

(54) EXECUTING THREADS OF AN APPLICATION ACROSS MULTIPLE COMPUTING DEVICES IN A DISTRIBUTED VIRTUAL MACHINE ENVIRONMENT

(75) Inventor: Chris Higgins, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1016 days.

(21) Appl. No.: 13/218,966

(22) Filed: Aug. 26, 2011

(51) Int. Cl.
*G06F 9/455* (2006.01)
*G06F 9/52* (2006.01)
*G06F 9/30* (2006.01)

(52) U.S. Cl.
CPC .............. *G06F 9/526* (2013.01); *G06F 9/3004* (2013.01)

(58) Field of Classification Search
None
See application file for complete search history.

(56) References Cited

U.S. PATENT DOCUMENTS

| | | | |
|---|---|---|---|
| 6,854,115 B1 * | 2/2005 | Traversat et al. | 718/1 |
| 7,716,377 B2 * | 5/2010 | Harris et al. | 709/248 |
| 2005/0160424 A1 * | 7/2005 | Broussard et al. | 718/1 |
| 2006/0242644 A1 * | 10/2006 | Blue | G06F 9/526 718/100 |
| 2007/0271450 A1 * | 11/2007 | Doshi | G06F 9/526 712/245 |
| 2008/0155546 A1 * | 6/2008 | Ruemmler | G06F 9/526 718/102 |
| 2010/0058337 A1 * | 3/2010 | Lloyd | G06F 9/526 718/1 |

* cited by examiner

*Primary Examiner* — Meng An
*Assistant Examiner* — James J Lee
(74) *Attorney, Agent, or Firm* — Davis Wright Tremaine LLP

(57) ABSTRACT

According to one embodiment, a computer-implemented method includes executing code for an application using a computing resource of a first computing device. The application requests execution of a first thread and a second thread. The first thread is executed using the computing resource of the first computing device. A second computing device is selected from a plurality of computing devices. The second computing device has an available computing resource to execute the second thread. The second thread is assigned to the second computing device. The second computing device is operable to execute the second thread using the available computing resource.

25 Claims, 3 Drawing Sheets

EXECUTING THREADS OF AN APPLICATION ACROSS MULTIPLE COMPUTING DEVICES IN A DISTRIBUTED VIRTUAL MACHINE ENVIRONMENT

BACKGROUND

A virtual machine is a software implementation of a machine (i.e. a computer) that executes applications like a computing device. A virtual machine may behave like a physical computer and contain its own virtual (i.e., software-based) CPU, RAM hard disk and network interface card (NIC). In some situations, a virtual machine may be provided with portions of physical hardware. For example, a virtual machine may be allocated portions of memory, processing time on a physical processor, or bandwidth on a physical network interface card. In some contexts, a virtual machine may be called a "guest" while the computing device, within which the virtual machine runs, may be called a "host."

BRIEF DESCRIPTION OF THE DRAWINGS

For a more complete understanding of the present disclosure and its advantages, reference is made to the following descriptions, taken in conjunction with the accompanying drawings, in which.

DESCRIPTION OF EXAMPLE EMBODIMENTS

As described above, a virtual machine is a software implementation of a machine (i.e. a computer) that executes applications like a computing device. A virtual machine may execute applications by using computing resources of its host computing device. Computing resources may include any hardware, firmware, and software resources, including, but not limited to, processors, memory, storage, and input-output devices. For example, a virtual machine may execute an application by assigning application threads to processors of the host computing device. A thread is a unit of processing that may be assigned or scheduled by an application or operating system.

As an application grows in size, the application may use additional resources from the host computing device. For example, larger applications may include additional threads to be executed on additional processors. To meet the increased demands, host computing devices may be provided with additional computing resources such as additional processors. Computing devices having additional resources, however, are more expensive to purchase and manage. Accordingly, some embodiments provide, among other capabilities, a distributed virtual machine environment across multiple computing devices.

For example, some embodiments provide a distributed virtual machine environment to execute an application across two or more computing devices. In some embodiments, this distributed virtual environment is transparent to the application and to users of the application. For example, the application may be written to be executed by one computing device, and the distributed virtual environment may execute the application across multiple computing devices with minimal or no changes to the application code. In this example, the application may not be aware that the distributed virtual machine environment is executing the application across multiple computing devices.

Some embodiments may execute an application across two or more computing devices with minimal latency. Generally, data travels faster between two processors within the same computing device than between two processors associated with different computing devices. Some embodiments may increase data transfer speeds between two computing devices by providing a high-speed network connection between the two computing devices. For example, a gigabit Ethernet connection may be provided between two computing devices hosting a distributed virtual machine environment. In some embodiments, the gigabit Ethernet connection may support data transfer rates on the order of 10 or 100 gigabits per second.

Figure 1:
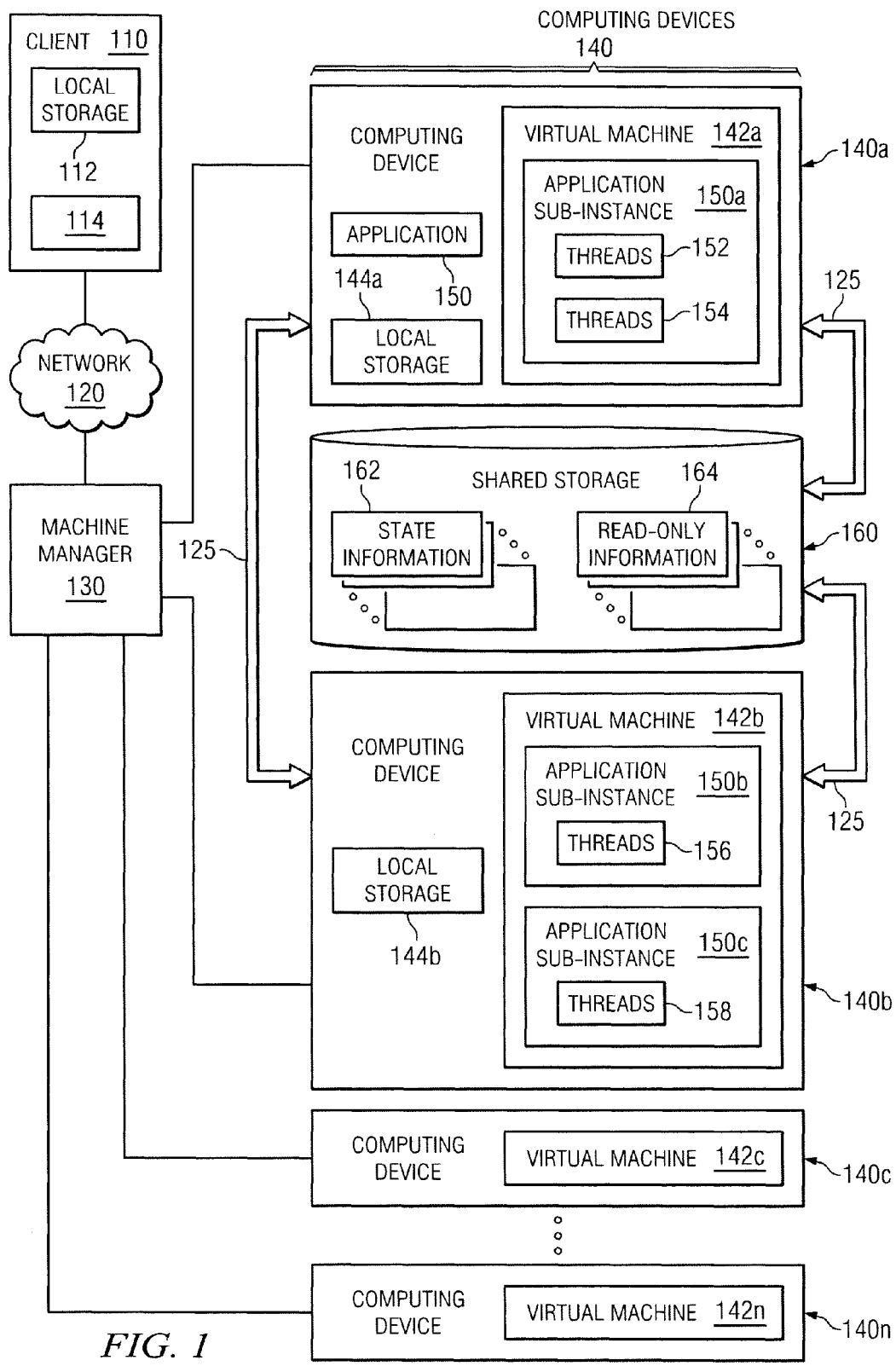
FIG. 1 illustrates an example system operable to provide a distributed virtual machine environment across two or more computing devices, according to some embodiments.

FIG. 1 illustrates an example system 100 operable to provide a distributed virtual machine environment across two or more computing devices. In the illustrated example, system 100 includes a client system 110, a machine manager 130, computing devices 140, and a shared repository 160, which may communicate using network 120 and/or network connections 125. Although system 100 is illustrated and primarily described as including particular components, the present disclosure contemplates system 100 including any suitable components, according to particular needs.

In general, system 100 is operable to execute application 150 across multiple computing devices 140 using a distributed virtual machine environment. In the illustrated example, application 150 has four threads 152, 154, 156, and 158. Computing devices 140 are operable to implement virtual machines 142. In the illustrated example, computing device 140a implements virtual machine 142a, computing device 140b implements virtual machine 142b, computing device 140c implements virtual machine 142c, and computing device 140n implements virtual machine 142n. Each virtual machine 142 may be operable to execute a sub-instance of application 150. In the illustrated example, virtual machine 142a executes application sub-instance 150a, and virtual machine 142b executes application sub-instances 150b and 150c. Each application sub-instance 150 is operable to execute threads of application 150. In this example, application sub-instance 150a instructs computing device 140a to execute threads 152 and 154, application sub-instance 150b instructs computing device 140b to execute threads 156, and application sub-instance 150c instructs computing device 140b to execute threads 158.

Client 110 may be implemented using any suitable type of processing system and may include any suitable combination of hardware, firmware, and software. One example of a machine client 110 may include, but is not limited to, computer system 400 of FIG. 4. In the illustrated example, client 110 includes local storage 112 and local devices 114. Local storage 112 may include any storage device associated with client 110, including, but not limited to, an internal or external hard drive. Local devices 114 may include any input/output devices associated with client 110, including, but not limited to, a monitor/screen, a mouse, a keyboard, a printer, or a scanner.

In general, client 110 may include one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, personal data assistant (PDA), one or more Internet Protocol (IP) telephones, smart phones, table computers, one or more servers, a server pool, one or more processors within these or other devices, or any other suitable processing device. Client 110 may be a stand-alone computer or may be a part of a larger network of computers associated with an entity.

Figure 4:
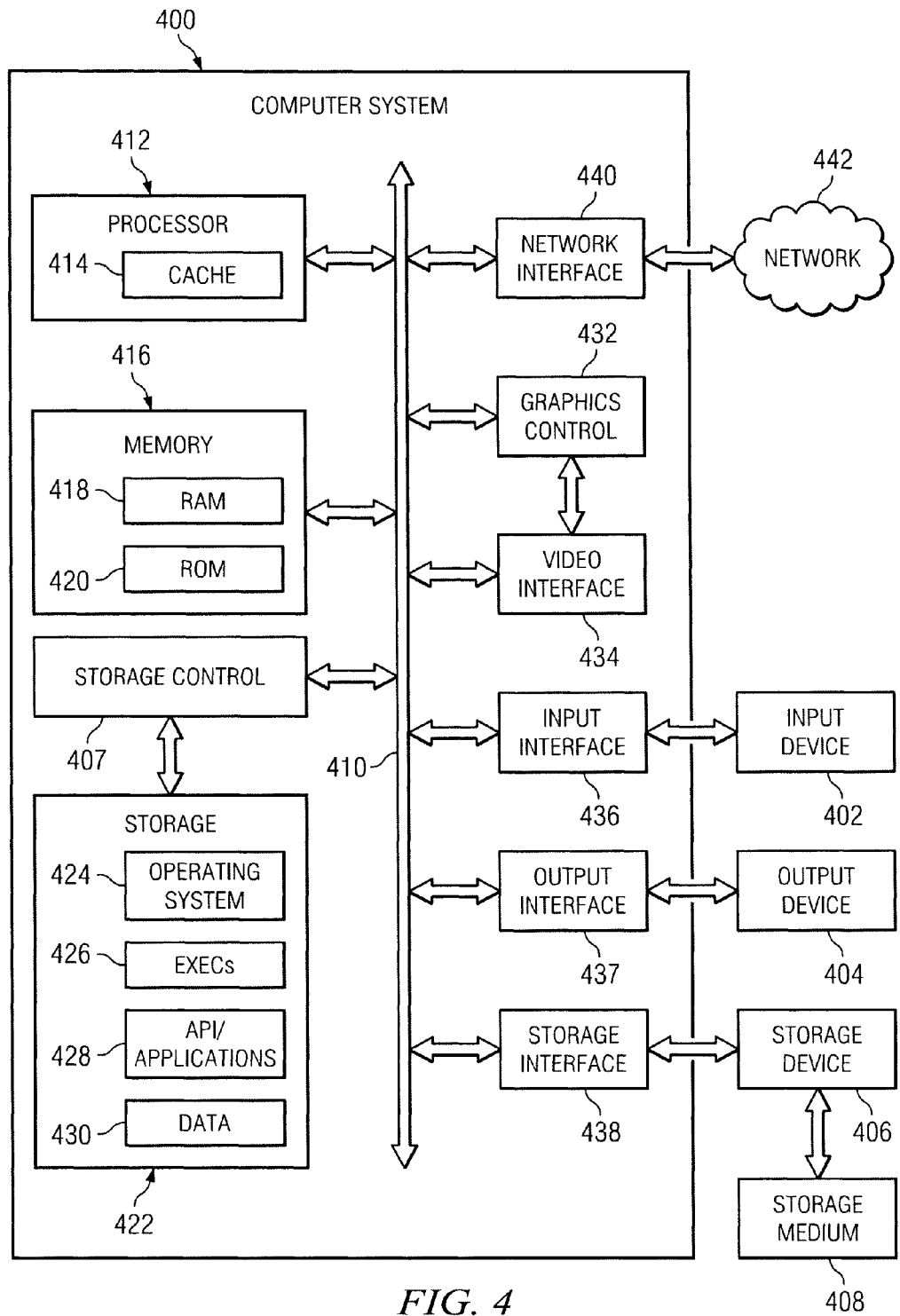
FIG. 4 illustrates an example computer system that may be used for one or more portions of the example system of FIG. 1, according to some embodiments.

Network 120 may represent any number and combination of wireline and/or wireless networks suitable for data transmission, including, but not limited to, network 442 of FIG. 4. In some embodiments, network 120 may include an internet connection between client 110 and machine manager 130.

Network connections 125 may represent any number and combination of wireline and/or wireless network connections suitable for data transmission, including, but not limited to, network 442 of FIG. 4. In some embodiments, network connections 125 may include high-speed network connections among computing devices 140 and repository 160. For example, a gigabit Ethernet connection may be provided between two computing devices 140 hosting a distributed virtual machine environment. In some embodiments, the gigabit Ethernet connection may support data transfer rates on the order of 10 or 100 gigabits per second.

Machine manager 130 may include any suitable type of processing system and may be implemented using any suitable combination of hardware, firmware, and software. One example of a machine manager 130 may include, but is not limited to, computer system 400 of FIG. 4. In general, machine manager 130 may be operable to manage computing devices 140 and route communications between client 110 and computing devices 140. For example, in one example embodiment, client 110 may request execution of application 150. In this example embodiment, machine manager 130 may select computing device 140*a* from among the computing devices 140 and route communications between client 110 and computing device 140*a*. In another example embodiment, machine manager 130 may monitor workloads of each computing device 140. For example, machine manager 130 may be operable to identify computing devices 140 with computing resources, such as processors and memory, available to execute threads of application 150. Machine manager 130 may also balance loads among computing devices 140. For example, machine manager 130 may instruct virtual machine 142*a* to relocate threads 152 and 154 to another computing device if computing device 140*a* is running low on available resources.

Each computing device 140 may be implemented using any suitable type of processing system and may include any suitable combination of hardware, firmware, and software. One example of a computing device 140 may include, but is not limited to, computer system 400 of FIG. 4. In the illustrated example, four computing devices 140*a*, 140*b*, 140*c*, and 140*n* are shown, although embodiments of system 100 may include more or fewer computing devices 140.

Computing devices 140 may reside in any suitable location. In one example embodiment, at least some of computing devices 140 share space in the same computing rack or server farm. In some embodiments, computing devices 140 may be located in different geographic areas.

Each computing device 140 is operable to implement a virtual machine 142. In the illustrated example, computing device 140*a* implements virtual machine 142*a*, computing device 140*b* implements virtual machine 142*b*, computing device 140*c* implements virtual machine 142*c*, and computing device 140*n* implements virtual machine 142*n*. In general, virtual machine 142 may represent any software implementation of a machine (i.e. a computer) that executes applications like a computing device. Virtual machine 142 may execute applications by using resources of its host computing device. For example, virtual machine 142*a* may execute threads 152 and 154 using processors of computing device 140*a*.

Each computing device 140 may include local storage that is accessible by a virtual machine 142. In the illustrated example, computing device 140*a* includes local storage 144*a* accessible by virtual machine 142*a*, and computing device 140*b* includes local storage 144*b* accessible by virtual machine 142*b*. One example of a local storage 144 may include, but is not limited to, storage module 422 of FIG. 4.

Application 150 may include any collection of programs, procedures, algorithms, and instructions to be executed. In the illustrated example, application 150 includes instructions to execute four threads 152, 154, 156, and 158. Threads 152, 154, 156, and 158 may represent any unit of processing that may be assigned or scheduled by an application or operating system. In the illustrated example, threads 152 and 154 are assigned to computing device 140*a*, and threads 156 and 158 are assigned to computing device 140*b*. A thread may be assigned to a computing device 140 by identifying any component or feature of the computing device 140, including, but not limited to, identifying a name of the computing device, a processor of the computing device, a virtual machine running on the computing device, and/or identifying application sub-instances that happen to be associated with a particular computing device. In addition, threads may be assigned by any entity associated with application 150. In the example of FIG. 1, threads may be assigned by computing device 140*a*, virtual machine 142*a*, and/or application sub-instance 150*a*.

Each virtual machine 142 may be operable to execute a sub-instance of application 150. Each sub-instance of application 150 includes the programs, procedures, algorithms, and instructions for executing threads of application 150. A sub-instance may not necessarily include all of the code for application 150. For example, in some embodiments, a sub-instance may only include code relevant to or otherwise appropriate for execution of a particular thread.

In the illustrated example, virtual machine 142*a* executes application sub-instance 150*a*, and virtual machine 142*b* executes application sub-instances 150*b* and 150*c*. Each application sub-instance is operable to execute threads of application 150. In this example, application sub-instance 150*a* instructs computing device 140*a* to execute threads 152 and 154, application sub-instance 150*b* instructs computing device 140*b* to execute threads 156, and application sub-instance 150*c* instructs computing device 140*b* to execute threads 158.

Shared repository 160 may represent any storage device accessible by two or more computing devices 140. One example of a shared repository 160 may include, but is not limited to, storage module 406 of FIG. 4. In some embodiments, application code 150 may be stored on shared repository 160 in place of or in addition to being stored on computing device 140*a*.

In some embodiments, shared repository 160 may store state information 162. In general, a state is a unique configuration of information in a program or machine. State information 162 may include properties that may be modified during execution of a thread of application 150. In one example embodiment, shared repository 160 includes state information 162 that may be modified by thread 152 of computing device 140a and by thread 156 of computing device 140b.

In some embodiments, state information 162 may be checked out to one thread, which may temporarily prohibit other threads from modifying state information 162. Thus, in some embodiments, state information 162 may be locked such that other threads do not modify the state information. For example, if execution of thread 152 will result in changes to state information 162, state information 162 may be checked out to thread 152, preventing threads 154, 156, and 158 from modifying state information 162.

In some embodiments, all or some of state information 162 may be stored on computing devices 140 either temporarily or permanently. For example, if execution of thread 152 will result in changes to state information 162, state information 162 may be checked out and copied to local storage 144a. In this example, thread 152 may modify the copy of state information 162 on local storage 144a. This modified copy may be communicated back to shared storage 160. The modified copy may replace the checked out state information 162, and state information 162 may be unlocked.

In some embodiments, shared repository 160 may store read-only information 164. Read-only information 164 may include any information accessed by a thread but that is not modifiable by the thread. Read-only information 164 may also be stored locally by the computing devices 140 (e.g., in local storage 144). For example, if computing device 140c initiates virtual machine 142c, virtual machine 142c may download a local copy of read-only information 164 to computing device 140c. Storing read-only information 164 locally may improve the speed of thread execution.

In operation of an example embodiment of system 100, virtual machines 142 provide a distributed virtual machine environment in which to execute application 150 across multiple computing devices 140. In one example, client 110 requests execution of application 150. Machine manager 130 routes the request from client 110 to computing device 140a. Computing device 140a implements virtual machine 142a and executes application 150 within virtual machine 142a.

Application 150 may request execution of multiple threads. In this example, application 150 requests execution of four threads 152, 154, 156, and 158. Virtual machine 142a assigns the threads to available computing resources. In this example, virtual machine 142a assigns the four threads 152, 154, 156, and 158 to four processors. Virtual machine 142a assigns threads 152 and 154 to processors local to computing device 140a and assigns threads 156 and 158 to processors associated with computing device 140b, which is remote from computing device 140a. In this example, application 150 is unaware that threads 156 and 158 will be executed on computing device 140b. Rather, the existence and location of computing device 140b may be known to virtual machine 142a but not application 150.

Virtual machine 142a initiates application sub-instance 150a to execute threads 152 and 154. Application sub-instance 150a includes the code from application 150 which may be used to execute threads 152 and 154. Virtual machine 142a instructs computing device 140b to initiate application sub-instances 150b and 150c. Application sub-instance 150b includes the code from application 150 which may be used to execute thread 156 on computing device 140b. Application sub-instance 150c includes the code from application 150 which may be used to execute thread 158 on computing device 140b.

In the example of FIG. 1, virtual machines 142a and 142b communicate across network connection 125. In one example embodiment, network connection 125 may be a high-speed network connection, such as a gigabit network connection. In some embodiments, providing a high-speed network connection between virtual machines 142a and 142b may allow virtual machines 142a and 142b to provide a distributed virtual machine environment that executes threads quickly regardless of the physical location of the computing resources.

In the example of FIG. 1, virtual machine 142a assigns threads 152 and 154 to computing resources local to computing device 140a. In some embodiments, however, virtual machine 142a may not assign any threads to computing resources local to computing device 140a. Rather, virtual machine 142a may assign all threads to remote computing resources. In this example, virtual machine 142a may act as a master virtual machine, managing and monitoring the execution of threads across remote computing resources. For example, virtual machine 142a may maintain a table of threads that identifies where each thread is assigned even if none of the threads are assigned to computing device 140a.

In the example of FIG. 1, virtual machine 142a assigns threads 156 and 158 to computing device 140b. In one example circumstance, however, computing device 140b may suffer a failure and be unable to execute threads 156 and 158. In this example embodiment, virtual machine 142a may detect failure of computing device 140b and assign threads 156 and 158 to one or more other computing devices (e.g., computing device 140c). Virtual machine 142a may detect failure of computing device 140b, for example, if computing device 140b does not execute threads 156 and 158 within an expected time period.

Figure 2:
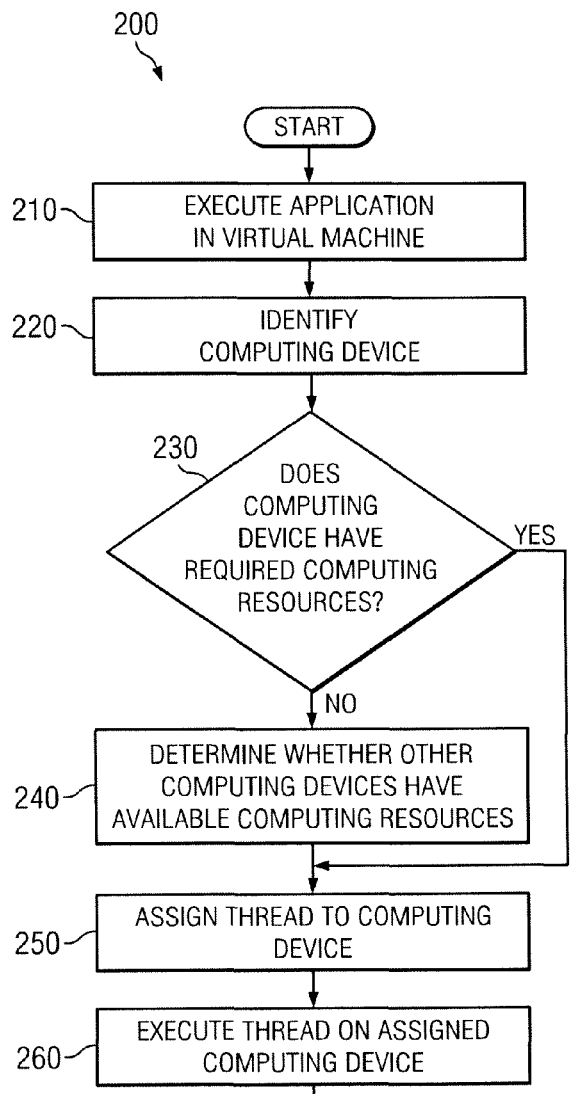
FIG. 2 illustrates an example method for assigning threads in a distributed virtual machine environment implemented across two or more computing devices, according to some embodiments.

FIG. 2 shows an example method 200 for assigning threads in a distributed virtual machine environment implemented across two or more computing devices. At step 210, computing device 140 executes application 150 in virtual machine 142a. In this example, application 150 requests execution of four threads 152, 154, 156, and 158. In this example, application 150 also requires certain computing resources for execution of threads 152, 154, 156, and 158. For example, application 150 may require that any computing device have certain available processing capability, available memory, available storage, or available input-out devices. Steps 220 through 260 address an example method for assigning thread 156 to computing device having the required computing resources.

At step 220, virtual machine 142a identifies a plurality of computing devices 140 including computing devices 140b, 140c, and 140n. At step 230, virtual machine 142a determines whether computing device 140b has the required computing resources for execution of thread 156. For example, application 150 may require that the computing device have an available processor, and virtual machine 142a may determine at step 230 whether computing device 140b has an available processor for executing thread 156. If not, virtual machine 142a determines at step 240 whether other computing devices 140, such as computing devices 140c and 140n, have an available processing unit. In this example, however, computing device 140b does have an available processing unit for executing thread 156. Thus, at step 250, virtual machine 142a assigns thread 156 to computing device 140b.

At step 260, virtual machine 142b executes thread 156 on computing device 140b to yield thread output. Thread output may include any information received as a result of executing a thread. For example, thread output may include updated state information 162. In this example, execution of thread 156 may include providing a mechanism to update state information 162 based on the thread output. As one example, execution of thread 156 may include identifying state information 162 associated with thread 156 and locking the identified state information 162 such that computing device 140a is prevented from modifying state information 162. In this example embodiment, virtual machine 142a may transmit a copy of state information 162 to computing device 140b. Virtual machine 142b may then instruct computing device 140b to execute thread 156 and receive the thread output. Virtual machine 142b may then update state information 162 with the thread output and then unlock state information 162. Unlocking state information 162 may allow other elements or processes to again modify state information 162.

Figure 3:
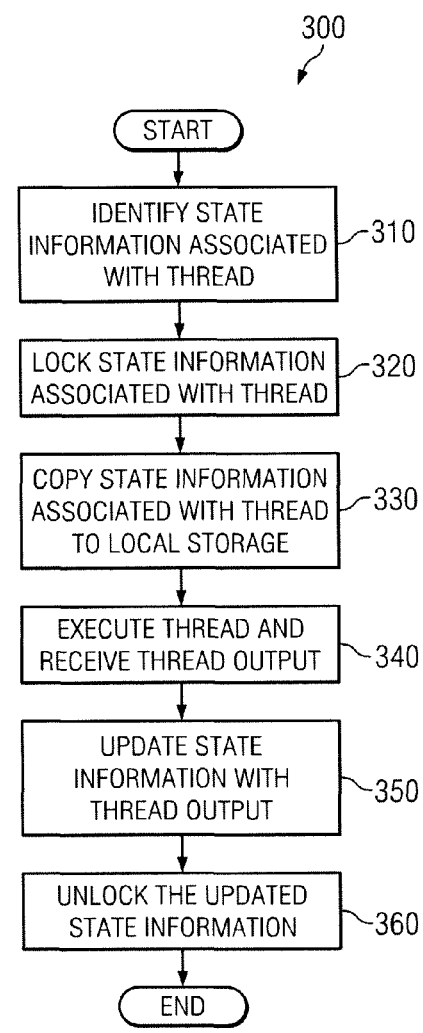
FIG. 3 illustrates an example method for updating state information shared by virtual machines, according to some embodiments.

FIG. 3 illustrates an example method for updating state information shared by virtual machines, according to some embodiments. In this example, execution of thread 156 yields updates to state information 162.

At step 310, virtual machine 142b identifies state information 162 associated with thread 156. In this example, state information 162 associated with thread 156 includes state information 162 that will be updated as a result of execution of thread 156. At step 320, virtual machine 142b locks the state information 162 associated with thread 156. Locking the state information 162 associated with thread 156 may prevent threads 152, 154, and 158 from modifying the state information 162 associated with thread 156.

At step 330, virtual machine 142b copies the state information 162 associated with thread 156 to local storage 144b. At step 340, virtual machine 142b executes thread 156 and receives thread output as a result of execution of thread 156. At step 350, virtual machine 142b updates the state information 162 associated with thread 156 stored on shared storage 160. At step 360, virtual machine 142b unlocks the state information 162 associated with thread 156.

FIG. 4 illustrates an example computer system 400 that may be used for one or more sub-instances of example system 100 of FIG. 1, according to some embodiments. Although the present disclosure describes and illustrates a particular computer system 400 having particular components in a particular configuration, the present disclosure contemplates any suitable computer system having any suitable components in any suitable configuration. Moreover, computer system 400 may have take any suitable physical form, such as for example one or more integrated circuit (ICs), one or more printed circuit boards (PCBs), one or more handheld or other devices (such as mobile telephones or PDAs), one or more personal computers, one or more supercomputers, one or more servers, and one or more distributed computing elements. Portions or all of client 110, processing system 204, storage module 108, and computing resources 110 may be implemented using all of the components, or any appropriate combination of the components, of computer system 400 described below.

Computer system 400 may have one or more input devices 402 (which may include a keypad, keyboard, mouse, stylus, or other input devices), one or more output devices 404 (which may include one or more displays, one or more speakers, one or more printers, or other output devices), one or more storage devices 406, and one or more storage media 408. An input device 402 may be external or internal to computer system 400. An output device 404 may be external or internal to computer system 400. A storage device 406 may be external or internal to computer system 400. A storage medium 408 may be external or internal to computer system 400.

System bus 410 couples subsystems of computer system 400 to each other. Herein, reference to a bus encompasses one or more digital signal lines serving a common function. The present disclosure contemplates any suitable system bus 410 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 400 includes one or more processors 412 (or central processing units (CPUs)). A processor 412 may contain a cache 414 for temporary local storage of instructions, data, or computer addresses. Processors 412 are coupled to one or more storage devices, including memory 416. Memory 416 may include RAM 418 and ROM 420. Data and instructions may transfer bi-directionally between processors 412 and RAM 418. Data and instructions may transfer uni-directionally to processors 412 from ROM 420. RAM 418 and ROM 420 may include any suitable computer-readable storage media.

Computer system 400 includes fixed storage 422 coupled bi-directionally to processors 412. Fixed storage 422 may be coupled to processors 412 via storage control unit 407. Fixed storage 422 may provide additional data storage capacity and may include any suitable computer-readable storage media. Fixed storage 422 may store an operating system (OS) 424, one or more executables (EXECs) 426, one or more applications or programs 428, data 430 and the like. Fixed storage 422 is typically a secondary storage medium (such as a hard disk) that is slower than primary storage. In appropriate cases, the information stored by fixed storage 422 may be incorporated as virtual memory into memory 416. In some embodiments, fixed storage 422 may include network resources, such as one or more storage area networks (SAN) or network-attached storage (NAS). In some embodiments, operating system 424, EXECs 426, application or programs 428, and data 430 may be stored on storage device 406 and/or storage medium 408 instead of or in addition to storage 422.

Processors 412 may be coupled to a variety of interfaces, such as, for example, graphics control 432, video interface 434, input interface 436, output interface 437, and storage interface 438, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 440 may couple processors 412 to another computer system or to network 442. Network interface 440 may include wired, wireless, or any combination of wired and wireless components. Such components may include wired network cards, wireless network cards, radios, antennas, cables, or any other appropriate components. With network interface 440, processors 412 may receive or send information from or to network 442 in the course of performing steps of some embodiments. Some embodiments may execute solely on processors 412. Some embodiments may execute on processors 412 and on one or more remote processors operating together.

In a network environment, where computer system 400 is connected to network 442, computer system 400 may communicate with other devices connected to network 442. Computer system 400 may communicate with network 442 via network interface 440. For example, computer system 400 may receive information (such as a request or a response from another device) from network 442 in the form of one or more incoming packets at network interface 440 and memory 416 may store the incoming packets for subsequent processing. Computer system 400 may send information (such as a request or a response to another device) to network 442 in the form of one or more outgoing packets from network interface 440, which memory 416 may store prior to being sent. Processors 412 may access an incoming or outgoing packet in memory 416 to process it, according to particular needs.

Network 442 may represent any number and combination of wireline and/or wireless networks suitable for data transmission, including, but not limited to, network 120 of FIG. 1. Network 442 may, for example, communicate internet protocol packets, frame relay frames, asynchronous transfer mode cells, and/or other suitable data between network addresses. Network 442 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the illustrated embodiment shows one network 442, teachings of some embodiments recognize that more or fewer networks may be used and that not all elements may communicate via a network. Teachings of some embodiments also recognize that communications over a network is one example of a mechanism for communicating between parties, and any suitable mechanism may be used.

Some embodiments involve one or more computer-storage products that include one or more tangible, computer-readable storage media that embody software for performing one or more steps of one or more processes described or illustrated herein. In some embodiments, one or more portions of the media, the software, or both may be designed and manufactured specifically to perform one or more steps of one or more processes described or illustrated herein. Additionally or alternatively, one or more portions of the media, the software, or both may be generally available without design or manufacture specific to processes described or illustrated herein. Example computer-readable storage media include, but are not limited to, CDs (such as CD-ROMs), FPGAs, floppy disks, optical disks, hard disks, holographic storage devices, ICs (such as ASICs), magnetic tape, caches, PLDs, RAM devices, ROM devices, semiconductor memory devices, and other suitable computer-readable storage media. In some embodiments, software may be machine code which a compiler may generate or one or more files containing higher-level code which a computer may execute using an interpreter.

As an example and not by way of limitation, memory 416 may include one or more tangible, computer-readable storage media embodying software and computer system 400 may provide particular functionality described or illustrated herein as a result of processors 412 executing the software. Memory 416 may store and processors 412 may execute the software. Memory 416 may read the software from the computer-readable storage media in mass storage device 416 embodying the software or from one or more other sources via network interface 440. When executing the software, processors 412 may perform one or more steps of one or more processes described or illustrated herein, which may include defining one or more data structures for storage in memory 416 and modifying one or more of the data structures as directed by one or more portions the software, according to particular needs.

In some embodiments, the described processing and memory elements (such as processors 412 and memory 416) may be distributed across multiple devices such that the operations performed utilizing these elements may also be distributed across multiple devices. For example, software operated utilizing these elements may be run across multiple computers that contain these processing and memory elements. Other variations aside from the stated example are contemplated involving the use of distributed computing.

In addition or as an alternative, computer system 400 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

Although the present disclosure has been described with several embodiments, diverse changes, substitutions, variations, alterations, and modifications may be suggested to one skilled in the art, and it is intended that the disclosure encompass all such changes, substitutions, variations, alterations, and modifications as fall within the spirit and scope of the appended claims.

What is claimed is:

1. A system for executing an application across multiple computing devices, the system comprising:

a first computing device comprising a first memory unit and a first computing resource, the first computing device configured to implement a first virtual machine operable to:

execute code for the application, the application requesting execution of a first thread and a second thread;

execute the first thread using the first computing resource of the first computing device; and assign the second thread of the application to a second computing device before any scheduling or assignment of the second thread to a computing device other than the second computing device; and the second computing device, remote from the first computing device, the second computing device comprising a second memory unit and a second computing resource, the second computing device configured to implement a second virtual machine operable to:

execute the second thread using the second computing resource of the second computing device to generate a thread output, wherein the execution of the second thread includes steps to:
- identify state information associated with the second thread;
- lock the state information, wherein locking the state information prevents the first computing device from modifying the state information associated with the second thread;
- transmit, by the first virtual machine, a copy of the state information to the second computing device;
- update the state information with the thread output generated by the second computing device; and
- unlock the state information associated with the second thread.

2. The system of claim 1, further comprising a network connection between the first computing device and the second computing device, the first virtual machine operable to communicate with the second virtual machine using the network connection to share access to computing resources local to the first computing device and the second computing device.

3. The system of claim 1, further comprising:
- a third computing device comprising at least one memory unit and at least one computing resource; and
- a third virtual machine implemented on the third computing device, the third virtual machine operable to execute, in response to a failure of the second computing device, the second thread using the at least one computing resource of the third computing device.

4. The system of claim 1, wherein the first memory unit of the first computing device stores at least one of the following: the code for the application, state information shared by the first thread and the second thread, and read-only information shared by the first thread and the second thread.

5. The system of claim 1, further comprising a shared repository accessible by the first computing device and the second computing device, the shared repository storing at least one of the following: state information shared by the first thread and the second thread and read-only information shared by the first thread and the second thread.

6. A computer-implemented method for executing an application across multiple computing devices, the method comprising:
- executing, using a computing resource of a first computing device, code for the application on a first virtual machine implemented on the first computing device, the application requesting execution of a first thread and a second thread;
- executing, using the computing resource of the first computing device, the first thread;
- selecting a second computing device from a plurality of computing devices, the second computing device having an available computing resource to execute the second thread; and
- assigning the second thread to the second computing device before any scheduling or assignment of the second thread to a computing device other than the second computing device, the second computing device operable to execute the second thread on a second virtual machine implemented on the second computing device using the available computing resource to generate a thread output, wherein the execution of the second thread further comprises
  - identifying state information associated with the second thread;
  - locking the state information, wherein locking the state information prevents the first computing device from modifying the state information associated with the second thread;
  - transmitting a copy of the state information to the second computing device;
  - updating the state information with the thread output generated by the second computing device; and
  - unlocking the state information associated with the second thread.

7. The method of claim 6, wherein executing the first thread using the computing resource of the first computing device comprises:
- opening a first sub-instance of the application in a first virtual machine on the first computing device; and
- executing the first thread in the first virtual machine.

8. The method of claim 6, wherein executing the second thread using the available computing resource comprises:
- opening a second sub-instance of the application in a second virtual machine on the second computing device; and
- executing the second thread in the first virtual machine.

9. The method of claim 6, further comprising:
- detecting a failure of the second computing device; and
- assigning the second thread to a third computing device, the third computing device having an available computing resource to execute the second thread, the third computing device operable to execute the second thread using the available computing resource of the third computing device.

10. The method of claim 6, wherein assigning the second thread to the second computing device comprises:
- identifying a plurality of computing devices; and
- selecting the second computing device from the plurality of computing devices based on whether the second computing device has an available processor for executing the second thread.

11. The method of claim 6, wherein the code for the application is stored by at least one memory unit of the first computing device.

12. The method of claim 6, further comprising storing state information shared by the first thread and the second thread on at least one memory unit of the first computing device.

13. The method of claim 6, further comprising storing read-only information shared by the first thread and the second thread on at least one memory unit of the first computing device.

14. The method of claim 6, further comprising storing state information shared by the first thread and the second thread on a shared repository accessible by the first computing device and the second computing device.

15. One or more non-transitory computer readable media comprising logic for executing an application across multiple computing devices, the logic, when executed by a processor, operable to:
- receive, from a client, a request to execute code for the application, the application requesting execution of a first thread and a second thread;
- execute the code for the application in a first virtual machine implemented on a first computing device, the first computing device comprising at least one memory unit and at least one computing resource;
- identify a plurality of computing resources including the at least one computing resource of the first computing device and at least one computing resource remote from the first computing device;

execute the first thread using the at least one computing resource of the first computing device;

assign the second thread to a remote computing resource of the plurality of computing resources before any scheduling or assignment of the second thread to a computing resource other than the remote computing resource of the plurality of computing resources; and execute the second thread on a second virtual machine using the remote computing resource to generate a thread output, wherein the execution of the second thread includes steps to:

identify state information associated with the second thread;

lock the state information, wherein locking the state information prevents the first computing device from modifying the state information associated with the second thread;

transmit a copy of the state information to the second computing device;

update the state information with the thread output generated by the second computing device; and unlock the state information associated with the second thread.

16. The media of claim 15, wherein the logic, when executed, is further operable to:

identify a plurality of memory units including the at least one memory unit of the first computing device and at least one memory unit remote from the first computing device; and select one of the plurality of memory units for storage of the thread output, wherein assigning the thread to the selected computing resource further comprises instructing the selected computing resource to store the thread output to the selected memory unit of the plurality of memory units.

17. The media of claim 16, wherein the selected memory unit of the plurality of memory units is local to the client.

18. The media of claim 16, wherein a physical location of the selected memory unit of the plurality of memory units is transparent to the code for the application.

19. The media of claim 15, wherein a physical location of the selected computing resource is transparent to the code for the application.

20. A system for executing an application across multiple computing devices, the system comprising:

a first computing device comprising at least one memory unit and at least one computing resource, the first computing device configured to implement a first virtual machine operable to:

execute code for the application, the application requesting execution of a first thread and a second thread;

identify a plurality of computing resources including the at least one computing resource of the first computing device and at least one computing resource remote from the first computing device;

execute the first thread using the at least one computing resource of the first computing device;

assign the second thread to a remote computing resource of the plurality of computing resources for execution, assigning the second thread to the remote computing resource of the plurality of computing resources occurring before any scheduling or assignment of the second thread to a computing resource other than the remote computing resource of the plurality of computing resources; and a second computing device, remote from the first computing device, the second computing device comprising a second memory unit and the remote computing resource, the second computing device configured to implement a second virtual machine operable to:

execute the second thread using the remote computing resource of the second computing device to generate a thread output, wherein the execution of the second thread includes steps to:

identify state information associated with the second thread;

lock the state information, wherein locking the state information prevents the first computing device from modifying the state information associated with the second thread;

transmit, by the first virtual machine, a copy of the state information to the second computing device;

update the state information with the thread output generated by the second computing device; and unlock the state information associated with the second thread.

21. The system of claim 20, further comprising a network connection between the first computing device and the second computing device, the first virtual machine is further operable to communicate with the second virtual machine using the network connection to share access to computing resources local to the first computing device and the second computing device.

22. The system of claim 20, wherein assigning the thread comprises assigning the thread to the at least one computing resource of the first computing device.

23. The system of claim 20, wherein:

the first virtual machine is further operable to:

identify a plurality of memory units including the at least one memory unit of the first computing device and at least one memory unit remote from the first computing device; and select a memory unit of the plurality of memory units for storage of the thread output.

24. The system of claim 23, wherein a physical location of the selected memory unit is transparent to the code for the application.

25. The system of claim 20, wherein a physical location of the selected computing resource is transparent to the code for the application.

* * * * *